Figure 1:
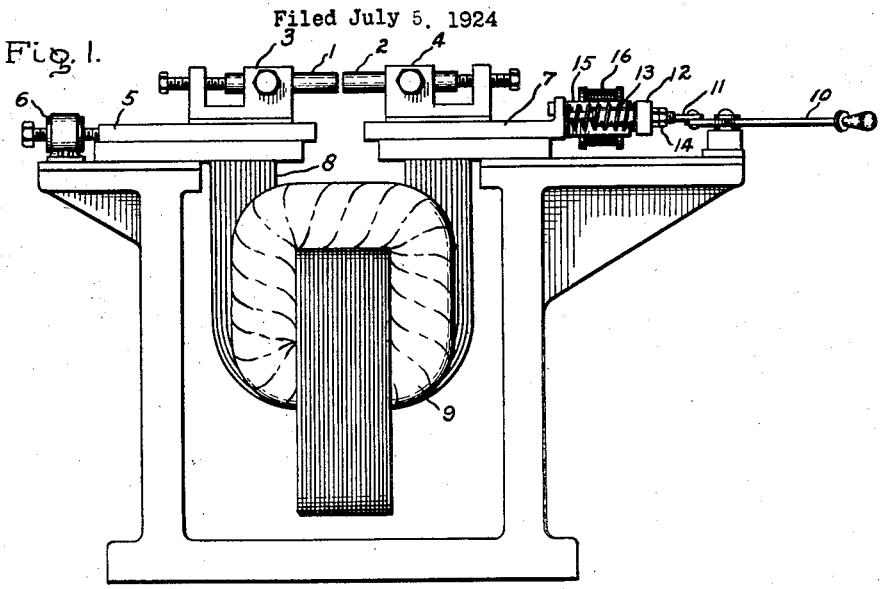

Jan. 6, 1925. 1,522,195

H. LEMP

ELECTRIC FLASH WELDING

Filed July 5, 1924

Inventor
Hermann Lemp
by
His Attorney

Patented Jan. 6, 1925.

1,522,195

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

ELECTRIC FLASH WELDING.

Application filed July 5, 1924. Serial No. 724,266.

*To all whom it may concern:*

Be it known that I, HERMANN LEMP, a citizen of the United States, residing at Erie, in the county of Erie, State of Pennsylvania, have invented certain new and useful Improvements in Electric Flash Welding, of which the following is a specification.

My invention relates to electric flash welding and an object of my invention is to provide an improved machine and method of operation which will make it possible to produce good welds with certainty and rapidity and which will not require the services of a highly skilled operator.

The original Thomson process of butt welding was practiced by placing two metal bars or other articles to be welded in contact with each other and passing a heavy current through them. Contact was maintained between the articles to be welded throughout the welding operation and when the metal pieces arrived at a welding temperature they were forced together and the current cut off.

One of the latest developments of the process of butt welding is called flash welding. In the flash welding process the articles to be welded are first brought together with a very light pressure. In this manner a greater concentration of heat is produced directly at the joint to be welded, a more even distribution of heat occurs over the joint to be welded and less power is required for producing the weld. A shower of sparks accompanies the process, there being many small arcs produced upon the melting or vaporization of the points or particles of metal through which the circuit is successively completed. When the adjacent surfaces of the articles to be welded have been brought to a proper welding temperature, the operator forces the articles together with a quick and strong pressure which generally causes the molten metal to squeeze out laterally in the form of a thin flange which can be broken or brushed off leaving the welded joint without the relatively large burr caused by the larger amount of metal which is softened and extruded in the original Thomson process.

In carrying out the flash welding process by manual control, considerable skill is required on the part of the operator in applying the light pressure with the requisite nicety to cause sparking to take place at the points of contact and not make the metals stick together before the entire surfaces of the parts to be welded have been brought to the proper temperature.

According to my invention, means are provided to produce a rapid periodic engagement and disengagement between the articles to be welded, thereby facilitating the desired sparking or arcing, and this periodic or vibratory engagement of the articles to be welded is accomplished without the necessity for special skill on the part of the operator of the machine.

My invention will be better understood from the following description taken in connection with the accompanying drawing, and its scope will be pointed out in the appended claims.

Figure 2:
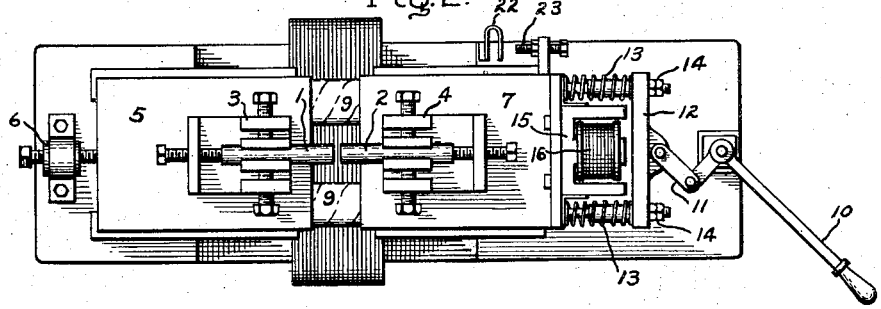
Figure 4:
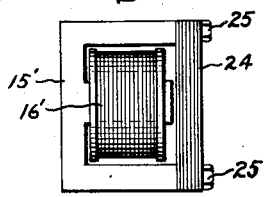
Figure 3:
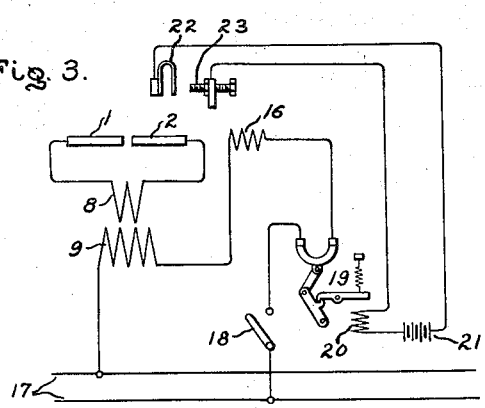

In the drawing, Fig. 1 is a side view of a welding machine embodying my invention; Fig. 2 is a top view thereof; Fig. 3 is a circuit diagram, and Fig. 4 shows a modified construction of a part of the machine.

In Figs. 1 and 2 the articles to be welded are shown at 1 and 2. These articles are shown as respectively clamped in the work-holding devices 3 and 4 of a conventional Thomson butt welding machine comprising a relatively fixed insulated platen 5 which carries the work-holding device 3. It is customary to provide means whereby the position of this work-holding clamp may be adjusted and such adjusting means is indicated in the drawing at 6. The work holding device 4 is mounted on a platen 7 arranged to be moved relatively to the platen 5 to bring the articles to be welded into engagement and to exert pressure thereupon.

A transformer is illustrated for supplying the welding current. This transformer is shown as comprising a single turn flexible secondary 8, one terminal of which is in circuit with the work-holding device 3 and the other terminal of which is in circuit with the work-holding device 4. The transformer primary is shown as a pair of coils 9 arranged one on each side of the secondary 8.

Any suitable operating means may be provided for moving the platen 7 to bring the articles to be welded into engagement and to exert pressure thereupon. In the drawing, this means is shown as a manually operated lever 10 connected by toggle links 11 to a cross head 12. Resilient means comprising springs 13 tend to force the platen 7 away from the cross head 12, the relative movement between the platen 7 and cross head 12 being limited by suitable adjusting means indicated as nuts 14 threaded upon rods which are secured to the platen and project through the cross head.

In order to produce a vibratory engagement between the articles to be welded, I provide means for vibrating the platen 7 with respect to the cross head 12 of the operating means. As shown in Figs. 1 and 2, an electromagnetically operated means is provided comprising an E-shaped magnetic core 15 secured to the platen. A winding 16 is shown mounted upon the middle leg of this core. In this arrangement the cross head 12 is arranged to act as an armature and upon the passage of current through the winding 16 the air gap between the armature and the core 15 is reduced and the springs 13 are compressed, thereby moving the platen 7 with respect to the operating means to cause the separation of the articles to be welded. I also provide means for rapidly making and breaking the circuit through the winding 16 thereby causing this winding to be rapidly energized and deenergized to produce the desired vibratory movement of the platen 7. This energization and deenergization of the winding 16 may be produced in a variety of ways. One suitable way is to connect the winding 16 in series with the primary winding of the welding transformer. This circuit arrangement is shown in Fig. 3.

Referring to Fig. 3, the conductors 17 represent a suitable source of alternating current for supplying the welding transformer. It will be observed that the circuit of the primary winding 9 of the transformer is in series relation with the winding 16 of the electromagnetic means for vibrating the platen. A switch 18 may be provided for controlling the primary circuit of the transformer. Suitable means may be provided for interrupting the welding circuit when the weld has been completed. This means is shown in Fig. 3 as a circuit breaker 19 which is tripped open by the coil 20 energized from any suitable source, indicated at 21, whenever the circuit of the coil 20 is completed. In the drawing, a pair of contacts 22 and 23 are provided for controlling the circuit breaker 19 in a manner common in the art of butt welding machines. The adjustable contact 23 is shown as mounted to move with the platen 7. These contacts are adjusted to engage and trip out the circuit breaker when the platen 7 makes its final movement to force firmly together the articles to be welded.

The operation of the arrangement is as follows: The operator, after having secured the articles to be welded in their clamps and after having closed the circuit breaker 19 and the main switch 18, Fig. 3, brings the parts to be welded into engagement by moving the lever 10. The initial pressure between the articles to be welded is exerted through the springs 13. As soon as the article 2 engages the article 1, the secondary circuit 8 of the transformer is completed and current flows in series relation through the primary winding 9 and the winding 16 of the electromagnetic vibratory means. The current through the winding 16 immediately draws the platen 7 back and separates the article 2 from the article 1. A break in the welding circuit is thus produced which weakens or deenergizes the winding 16, and the springs 13 again force the articles to be welded into engagement. The winding 16 is thus rapidly energized and deenergized and a vibratory movement is imparted to the work-holding device 4. This vibratory motion will keep the parts to be welded sparking all the time until brought to a welding temperature whereupon the operator will, by means of a quick and heavy pressure, force together the parts to be welded. At this time, the contact 23 will engage the contact 22 and trip out the circuit breaker 19 interrupting the circuit of the primary winding 9 of the transformer. The amplitude of the vibratory movement required is quite small and, while somewhat dependent upon the character of the work being done, is of the order of $\frac{1}{32}$ to $\frac{1}{16}$ inch. By reason of the provision of means for imposing a positive vibratory motion on the platen 7, the operator does not need to exercise any particular skill in his operation of the lever 10.

It will be apparent to those skilled in the art that my invention is not limited to the provision of manual means, such as the lever 10, for operating the platen 7, since this means may be replaced by automatic means for producing the desired movement of the cross head 12 or its equivalent.

While I have shown the winding 16 of the electromagnetic means in series with the primary winding 9 of the transformer, it will be apparent to those skilled in the art that my invention is not limited to this connection since any means may be provided for rapidly energizing and deenergizing this winding, and it is not essential that this energization and deenergization take place only after the articles to be welded are brought into engagement, since it is merely necessary that the vibratory action occur while the initial engagement between the articles to be welded is taking place, and the operation will be the same if this vibratory action is taking place even before such initial engagement. It will also be apparent to those skilled in the art that my invention is not limited to the provision of electromagnetic means for securing the desired vibratory movement. While electromagnetic means is well adapted to secure the desired operation, and permits a simple and convenient arrangement of parts, my invention in its broader aspects extends to the use of any suitable means for securing the desired vibratory action, whether such means involves the use of air pressure, or cam or other means for mechanically producing such vibrating action. The vibratory motion may also be produced by a motor mounted on the platen arranged by its operation to shake the platen. This motor may be of any desired type. One type of motor device is shown in Fig. 4. Referring to Fig. 4 a motor device for vibrating the platen is shown as comprising a core 15' which may be secured to the platen. This core is provided with a laminated bridge 24, the ends of which are securely clamped to the core 15', as for example, by the bolts 25, and this bridge makes a good magnetic contact with the outer legs of the core. The middle leg of the core is provided with a winding 16' and an air gap is provided between this middle leg and bridge 24. The laminated bridge 24 is of a springing nature and this bridge will vibrate with considerable violence when an ordinary alternating current is passed through the winding 16' as is well known in the art. The winding 16' may be connected in series with the primary of the welding transformer, just as the winding 16 is connected in Fig. 3, and a mechanical vibration will be imparted to the platen 7 to produce the desired vibratory engagement of the articles to be welded.

It is desirable to connect the controlling coil for the vibratory means in series relation with the welding circuit, since with such connection the vibratory action ceases when the articles are forced into continuous engagement and as soon as the welding circuit is interrupted. There is thus no tendency to produce a continued vibration which might interfere with the proper knitting together of the articles to be welded. With the arrangement of Fig. 2, it is, however, not essential that the winding 16 be deenergized at the completion of the weld, since the compression of the springs 13 may permit the cross head 12 to engage positively the frame 15 when the final heavy pressure is applied. With the armature held firmly against the core of the electromagnetic device, the vibratory movement of the platen with respect to the operating means ceases. Whatever the character of the means provided for securing the vibratory action, it is desirable that the vibratory movement of the platen be stopped by suitable means electrically or mechanically operated at the instant the heavy pressure is applied for completing the weld.

In view of the foregoing description, it will be apparent that my invention is not limited to the particular embodiments shown and described, since further modifications and variations may be made without departing from my invention, it being merely essential that means be provided to produce a vibratory motion sufficient to prevent the terminals of the parts to be welded from being squeezed together and maintained in premanent engagement unless they are positively forced into each other with a heavy pressure.

What I claim as new and desire to secure by Letters Patent of the United States, is,—

1. An electric flash welding machine of the type comprising work-holding devices and means for producing relative movement between said devices to bring the articles to be welded into engagement and to exert pressure thereupon, characterized by the fact that means are provided for imparting a vibratory movement to one of said work-holding devices.

2. An electric flash welding machine comprising devices arranged to hold the articles to be welded, means arranged to produce relatives movement between said devices to bring the articles to be welded into engagement and to exert pressure thereupon, means arranged to supply welding current through said articles while in engagement, and means arranged to produce a periodic and rapid engagement and disengagement of the articles to be welded.

3. An electric flash welding machine comprising a movable platen for holding one of the articles to be welded, means adapted to be operated to move said platen to cause engagement between the articles to be welded and to exert pressure thereupon, and electromagnetic means for imparting a vibratory movement to said platen.

4. An electric flash welding machine comprising a movable platen for holding one of the articles to be welded, operating means for moving said platen to cause engagement between the articles to be welded and for exerting pressure thereupon, resilient means between said platen and said operating means for transmitting motion from said operating means to said platen, electromagnetic means for cooperating with said resilient means to move said platen relatively to said operating means connected and arranged to impart a vibratory movement to said platen.

5. An electric flash welding machine comprising work-holding devices, a transformer having its secondary circuit connected to said work-holding devices, a movable platen for operating one of said work-holding devices, operating means for moving said platen to cause engagement between the articles to be welded and for exerting pressure thereupon, and electromagnetic means arranged to vibrate said platen with respect to said operating means comprising a winding in series with the primary of said transformer.

6. An electric flash welding machine comprising devices arranged to hold the articles to be welded, means arranged to produce relative movement between said devices to bring the articles to be welded into engagement and to exert pressure thereupon, means arranged to produce a vibratory action of one of said devices to cause a vibratory engagement of said articles to be welded, and means arranged to stop said vibratory action when said articles are forced into one another at the completion of the weld.

7. An electric flash welding machine comprising devices arranged to hold the articles to be welded, means arranged to produce relative movement between said devices to bring the articles to be welded into engagement and to exert pressure thereupon, means arranged to produce a vibratory action of one of said devices to cause a vibratory engagement of the articles to be welded, means arranged to interrupt the welding current when said articles are forced into one another at the completion of the weld, and means controlled by the welding current for stopping said vibratory action when the welding current is interrupted.

8. The method of flash welding with an electric welding machine of the butt welding type wherein devices are provided for holding the articles to be welded, which comprises producing a vibratory action of one of said work-holding devices to produce a rapidly intermittent engagement of the articles to be welded while passing a current between said articles to bring them to a welding temperature, then forcing said articles firmly against one another and stopping the flow of heating current.

In witness whereof, I have hereunto set my hand this second day of July, 1924.

HERMANN LEMP